No. 696,585. Patented Apr. 1, 1902.
W. H. OSTRANDER.
VEHICLE TIRE.
(Application filed Oct. 7, 1901.)
(No Model.)
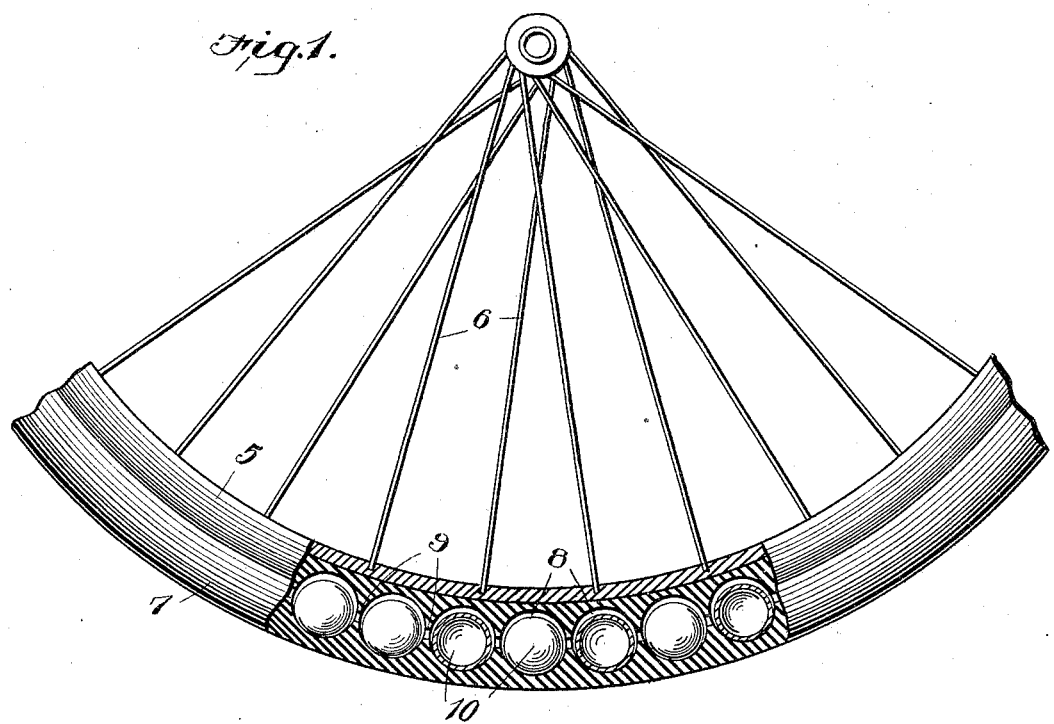
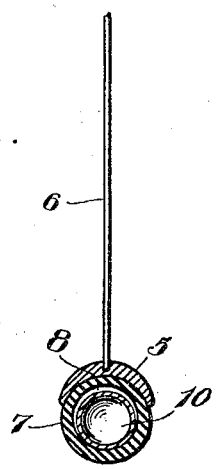
Witnesses
D. P. Brett
Harry Ellis Chandler
Inventor
W. H. Ostrander
Attorneys

UNITED STATES PATENT OFFICE.

WILLIAM H. OSTRANDER, OF POUGHKEEPSIE, NEW YORK, ASSIGNOR OF ONE-THIRD TO WILLIAM TYLER SMITH, OF POUGHKEEPSIE, NEW YORK.

VEHICLE-TIRE.

SPECIFICATION forming part of Letters Patent No. 696,585, dated April 1, 1902.

Application filed October 7, 1901. Serial No. 77,897. (No model.)

*To all whom it may concern:*

Be it known that I, WILLIAM H. OSTRANDER, a citizen of the United States, residing at Poughkeepsie, in the county of Dutchess, State of New York, have invented certain new and useful Improvements in Vehicle-Tires; and I do hereby declare the following to be a full, clear, and exact description of the invention, such as will enable others skilled in the art to which it appertains to make and use the same.

This invention relates to vehicle-tires, and more particularly to the class of elastic tires, the object of the invention being to provide a tire which will be well adapted for use in connection with automobiles, bicycles, and similar vehicles and which in its operation will have an increasing resistance as the pressure thereon is increased, the different movements of the tire when compressed being such that the different resistances are brought into action progressively.

A further object of the invention is to provide a construction of tire which will not be injured materially by punctures and which will be durable, other objects and advantages of the construction being evident from the following description.

In the drawings forming a portion of this specification, and in which like numerals of reference indicate similar parts in the several views, Figure 1 is a view showing a portion of a tire partly in section and partly in elevation. Fig. 2 is a transverse section through the tire.

Referring now to the drawings, there is shown a wheel comprising a felly 5 and spokes 6 and upon which felly is disposed the tire. The tire consists of the tube 7, which may be formed entirely of rubber or partly of rubber and partly of canvas, and in this tube are the spherical pockets 8, having the communicating openings or passages 9, the center of each of the openings being in a line passing through the centers of the pockets. There is thus produced a tire having a plurality of spherical pockets and communicating cylindrical passages. In each of the pockets is disposed an inelastic ball 10, which may be of steel, aluminium, or other suitable material, the balls being somewhat smaller in diameter than the pockets in which they are disposed and being hollow to reduce their weight.

With this construction it will be seen that when the tire is initially compressed the spherical pockets partially collapse and the balls are moved to the inner sides of the pockets, the tire in this action having the action of the cushion-tire, wherein the resiliency of the tire is utilized. Upon further compression of the tire the rubber is compressed against both the inner and outer surfaces of the balls, the inner surface meaning the surface toward the center of the wheel, and as the compression increases the rubber of the tire is squeezed between the balls to close the cylindrical passages connecting the spherical pockets, the resistance of the tire to compression gradually increasing, so that the tire is easy-running and comfortable, sudden bumpings and joltings being prevented.

It will be understood that in practice modifications of the specific construction shown may be used and that any specific and suitable materials and proportions may be employed for the various parts without departing from the spirit of the invention.

What is claimed is—

1. A vehicle-tire comprising an elastic tube having a plurality of pockets, and an inelastic body in each pocket, each of said bodies having a diameter sufficiently less than that of its pocket to permit of partial collapse of the pocket and subsequent compression of the body between the opposite walls thereof.

2. A vehicle-tire comprising an elastic tube having a plurality of pockets, and an inelastic body disposed loosely in each pocket, each of said bodies having a diameter sufficiently less than that of its pocket to permit of partial collapse of the pocket and subsequent compression of the body between the walls of the pocket.

3. A vehicle-tire comprising an elastic tube having spherical pockets therein, and an inelastic body disposed loosely within each pocket, each of said bodies having a diameter sufficiently less than that of its pocket to permit of partial collapse of the pocket and subsequent compression of the body between the walls of the pocket.

4. A vehicle-tire comprising an elastic tube having a plurality of inelastic bodies therein, each body having a diameter sufficiently less than that portion of the tire in which it is disposed, to permit of partial collapse of the tire and subsequent compression of the body between the walls of the tire.

5. A vehicle-tire comprising a body portion of elastic material having spherical pockets therein and intercommunicating passages, and an inelastic ball in each pocket, said balls having each a diameter sufficiently less than that of its pocket, to permit of partial collapse of the pocket and subsequent compression of the ball between the walls of the pocket.

6. A vehicle-tire comprising a body portion of elastic material having spherical pockets therein and intercommunicating passages, the axes of the passages and the centers of the pockets lying in the same circle, and an inelastic ball disposed loosely within each pocket, the diameter of each ball being sufficiently less than that of its pocket to permit of partial collapse of the pocket and subsequent compression of the ball between the walls of the pocket.

In testimony whereof I affix my signature in presence of two witnesses.

WILLIAM H. OSTRANDER.

Witnesses:
GUY H. MORGAN,
WILLIAM TYLER SMITH.